Dec. 22, 1942.   L. ALONS   2,306,291
METHOD OF ASSEMBLING THE MAGNET SYSTEM FOR ACOUSTIC DEVICES
Filed June 25, 1940
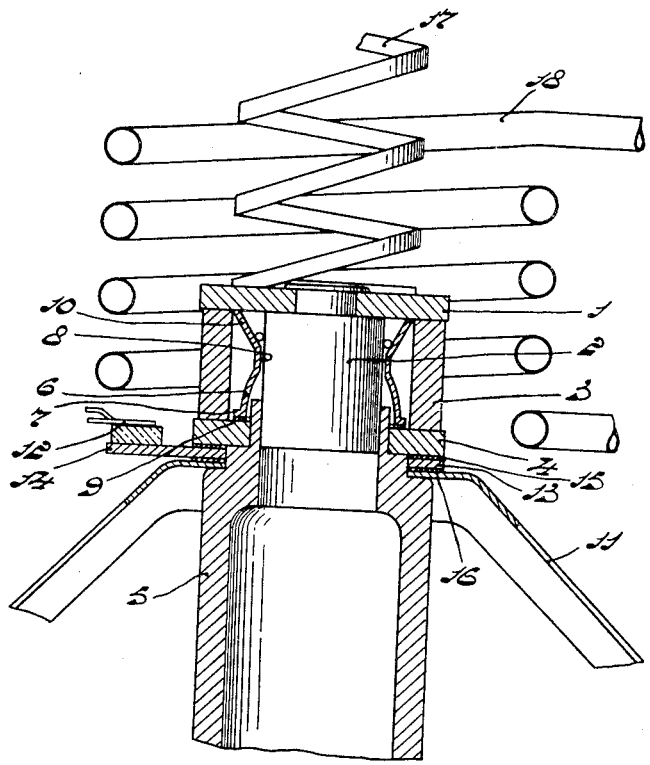
INVENTOR.
LUITJE ALONS
BY H. S. Grover
ATTORNEYS.

Patented Dec. 22, 1942

2,306,291

UNITED STATES PATENT OFFICE 2,306,291

METHOD OF ASSEMBLING THE MAGNET SYSTEM FOR ACOUSTIC DEVICES

Luitje Alons, Eindhoven, Netherlands, assignor to Radio Corporation of America, New York, N. Y.

Application June 25, 1940, Serial No. 342,303
In Germany July 25, 1939

4 Claims. (Cl. 113—112)

The invention relates to a method of assembling a moving coil magnet system which is clamped together by means of a bush connected both to the pole-plate of the magnet system and to the central pole thereof.

It has already come to be known to assemble in the above manner moving coil magnet systems for acoustic devices. The bush consisting of non-magnetic material is secured in a suitable manner concentrically with the central aperture in the annular upper pole-plate, for instance by spot-welding, soldering or screwing it to the bottom side of this pole-plate and subsequently connected thereto by means of a screw-thread, pins, clamping by friction or means of a lug to the central pole. The extreme parts of the magnet system are clamped between the pole-plate and the yoke secured to the central pole. This assembling method requires a number of different operations by which these magnet systems are rendered expensive especially in mass-production.

According to the invention assembling and keeping together such magnet systems is materially simplified by inserting between this bush and the pole-plate and between this bush and the central pole a layer of soldering material and after the parts of the system have been brought into their final relative position by heating the whole system to such a temperature and for such a time that the soldered joint is established.

The present invention permits the parts of the magnet system to be assembled in a templet, with the interposition of tin foil or a wire of tin solder at points where the soldered joint must be established and the whole system to be heated for a short time and to a sufficient temperature, for instance in a furnace or by means of a high-frequency alternating field, to cause this tinfoil to melt. After cooling the system can be removed as a whole from the templet. Since the system remains in the templet throughout the interconnection of the parts correct centering of the air-gap is ensured.

Another advantage of the invention is that in this way magnet systems which are internally not accessible for tools can nevertheless be assembled by means of soldered joints. When the bottom yoke is undetachably secured to the central pole, for instance by riveting or clenching the central pole in the yoke, the space about the central pole is no longer accessible for soldering tools after assembling the parts. According to the invention, however, such systems can be assembled by means of soldered joints.

Heating of the system so as to establish the soldered joints can be effected by means of various methods. It is possible, for instance, to place the whole system in a furnace wherein the temperature exceeds the melting temperature of the soldering material. However, it is to be taken into account that this temperature should not have such a high value that the magnet steel of the system looses its excellent magnetic properties. As a rule a temperature below 500° C. is sufficient for modern alloyed magnet steels, a temperature of about 250° C. even being sufficient for establishing a soldered joint by means of tin solder. However, this temperature is already liberally high for the prior carbon steels established by separation hardening. If, however, such magnet steels are used we may use soldering material having a lower melting temperature such as Wood's metal.

In the method according to the invention for assembling the parts of a magnet system it is particularly advantageous to effect magnetisation of the magnet only after assembling and soldering the system, since in this case there is no longer a risk of the magnetic induction being partly lost due to heating or iron particles are sucked into the air-gap.

The invention will be more fully explained by reference to the accompanying drawing representing one form of construction thereof.

The drawing illustrates the assemblage and the interconnection of the various parts of a moving coil magnet system of a loudspeaker.

The central pole 2 of the system is previously connected undetachably by clenching to the annular yoke plate 1. This constructional part together with the cylindrical shell 3 of magnet steel, the annular upper pole plate 4 and the bush 6 are assembled on a templet 5. This bush consisting of copper or meshing is slipped about the central pole 2. Where this bush engages the central pole there is provided a wire 8 of tin solder. The flange 7 contacting with the pole-plate 4 is also furnished with foil 9 of soldering material.

The bush 6 terminates past the soldered joint 8 in a conical part 10 whose bottom edge bears on the yoke-plate 1. Owing to its conical shape this part 10 is somewhat elastic in the direction of the longitudinal axis of the bush 6 so that upon compressing the parts of the magnet system the flange 7 with the soldering surface 9 of flange 7 engages the pole-plate 4. Thus a perfect soldered joint is ensured.

At the same time the diaphragm housing or dish-pan 11 and the terminal board 12 is connected to the magnet system in the same templet 5. For the sake of economy the diaphragm housing 11 is often stamped from sheet iron. If such an iron part were soldered to the pole-plate 4 without additional means the magnetic flux would partly extend also through this diaphragm housing and increase the leakage field. For this reason it is advantageous with diaphragm housings of sheet iron still to provide a ring 13 of non-magnetic metal such as meshing between the diaphragm housing 11 and the pole-plate 4. This ring 13 has an attachment 14 supporting the terminal board 12. A foil 15 and 16 respectively of soldering metal is inserted between the pole-plate 4 and ring 13 as well as between this ring 13 and the housing 11. Now the system is ready for the soldering operation.

The whole system including the diaphragm housing 11 and the support 13 for the terminal board is pressed on the templet 5 under the action of spring 17, the configuration of said templet causing the various parts to be exactly centered. During the soldering operation the system is immovably held by the action of spring 17 so that the exact central position subsists also after soldering. The coil 18 surrounding the system is now traversed for say 20 seconds by a high frequency alternating current so that induction currents are excited in the various parts of the system by which currents these parts are heated. The soldering metal melts and soldered joints are established at the surfaces 8, 9, 15 and 16. After cooling down the system the pressure of spring 17 is released and the assembled system can be removed from the templet 5.

Magnetisation of the magnet 3 is effected only after the system has been structurally finished and the magnet poles need no longer be touched by tools or the cylindrical shell 3 is no longer subjected to heating.

What I claim is:

1. In a magnet system for acoustic devices provided with a central core and an outer pole plate having a circular opening, the method of rigidly uniting said core and plate so that one end of the core extends into said plate opening to form an annular air gap, which consists in introducing a templet having an annular portion adapted to fit between the core and plate to maintain them in fixed spaced relation, providing a spacer member in abutting relation with both the core and plate, introducing a soldering substance between said abutting surfaces, and applying heat to the system for establishing soldered joints between the central core and the spacer member and between the outer pole plate and the spacer member.

2. In a magnet system for acoustic devices provided with a central core secured at one end to a circular yoke plate, an outer annular pole plate having a circular opening, and a cylindrical shell of magnet steel interposed between the yoke and pole plates and concentrically arranged with respect to the central core, the method of rigidly uniting said core and annular pole plate so that one end of the core extends into said pole plate opening to form an annular air gap, which consists in introducing a templet having an annular portion adapted to fit between the core and pole plate to maintain them in fixed spaced relation, providing a spacer member in the space between core and shell to have abutting relation with both the core and the pole plate, introducing a soldering substance between said abutting surfaces, and applying heat to the system for establishing soldered joints at said surfaces.

3. In a loudspeaker, the method of attaching the diaphragm housing to the magnet system which consists in supporting the rim portion at the small end of the housing upon a ledge portion of a cylindrical templet, supporting the outer pole plate of the magnet system upon a second ledge portion which is spaced from and indented with respect to the first ledge portion, interposing between the spaced surfaces of the pole plate and the housing rim portion a ring of non-magnetic material with a layer of solder on opposite sides thereof, and applying heat to establish a rigid union between diaphragm housing and pole plate.

4. In a loudspeaker, a magnet system and a diaphragm housing, the method of assembly which consists in supporting the rim portion at the small end of the diaphragm housing upon a ledge portion of a cylindrical templet, supporting the outer pole plate of the magnet system upon a second ledge portion which is spaced from and indented with respect to the first ledge portion, interposing between the spaced surfaces of the pole plate and the housing rim portion a ring of non-magnetic material with a layer of solder on opposite sides thereof, introducing the inner pole piece of the magnet system to fit snugly within a ring gauge of the templet the outer surface of which is adapted to fit snugly within the outer pole plate opening, applying a soldering substance to the under surface of the pole piece and to the inner surface of the pole plate, introducing a spacer member to extend between said surfaces, and applying heat to the system to establish a rigid union between the pole piece and the pole plate and between the diaphragm housing and the pole plate.

LUITJE ALONS.